United States Patent
Sourour (10) Patent No.: US 7,069,034 B1
(45) Date of Patent: Jun. 27, 2006

(54) SYSTEMS AND METHODS FOR REDUCED FORWARD LINK POWER CONTROL DELAY

(75) Inventor: Essam Sourour, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 876 days.

(21) Appl. No.: 09/717,334

(22) Filed: Nov. 22, 2000

(51) Int. Cl.
*H04Q 7/00* (2006.01)

(52) U.S. Cl. .................. 455/522; 455/69; 455/441; 455/442; 375/141

(58) Field of Classification Search ............... 455/522, 455/441, 442, 69; 375/141
See application file for complete search history.

(56) References Cited

U.S. PATENT DOCUMENTS

| | | | |
|---|---|---|---|
| 5,751,763 A * | 5/1998 | Bruckert | 375/141 |
| 5,963,870 A * | 10/1999 | Chheda et al. | 455/522 |
| 5,982,760 A * | 11/1999 | Chen | 370/335 |
| 6,067,049 A * | 5/2000 | Moriya | 342/418 |
| 6,154,659 A * | 11/2000 | Jalali et al. | 455/522 |
| 6,377,813 B1 * | 4/2002 | Kansakoski et al. | 455/522 |
| 2002/0105375 A1 * | 8/2002 | Sorokine | 329/345 |

FOREIGN PATENT DOCUMENTS

| | | |
|---|---|---|
| WO | WO 98/09384 | 3/1998 |
| WO | WO 99/43100 | 8/1999 |

OTHER PUBLICATIONS

Performance of WCDMA System with Space Diversity and Power Control in Slowly Fading Channel Models; Markku Tarkiainen et al.; 5 pages; 1998.

Performance of Fast Forward Link Power Control for CDMA Systems; A. Jalali et al.; pages 630-633; 1998.

\* cited by examiner

*Primary Examiner*—Nay Maung
*Assistant Examiner*—Alan T. Gantt
(74) *Attorney, Agent, or Firm*—Coats & Bennett, P.L.L.C.

(57) ABSTRACT

A communication system includes a mobile terminal and a base station. The mobile terminal estimates signal quality of a forward link during a first power control group period and determines a power control bit based on the estimated signal quality. The mobile terminal further transmits the power control bit on a reverse link during the first power control group period. The base station receives the power control bit on the reverse link and modifies forward link power based on the power control bit at commencement of a second power control group period.

17 Claims, 12 Drawing Sheets

SYSTEMS AND METHODS FOR REDUCED FORWARD LINK POWER CONTROL DELAY

BACKGROUND OF THE INVENTION

The present invention relates generally to systems and methods for transmission power control in communication systems and, more particularly, to systems and methods for forward link power control in radio-communication systems.

Forward link power control has conventionally been implemented in a number of radio-communications systems, including, for example, the CDMA2000 and WCDMA systems. In such systems, forward link power control is used to combat Rayleigh fading of the forward link propagation channel at slow mobile terminal mobility. Due to the motion of the mobile terminal and/or the surrounding environment, the forward link propagation channel gain increases or decreases continuously. The signal-to-interference ratio (SIR) of the signal received at the mobile terminal, therefore, will also change according to the changes in the forward link propagation channel gain.

The following description pertains to the CDMA system as an example. In CDMA2000, when forward link power control is used, the base station sends a target frame error rate (FER) for the forward traffic channel to the mobile terminal when forward link power control is used. The mobile terminal then maps the target FER into the target SIR that is required to achieve the target FER. Subsequent to determining the target SIR, the mobile terminal estimates the received SIR over substantially the entire duration of each power control group of the forward link and sends power control bits (PCBs) to the base station multiplexed on the reverse pilot channel. If the received SIR is below the target SIR, the mobile terminal sends a power control bit with a value of +1 to request a power step up. If the received SIR is equal to, or above, the target SIR, the mobile terminal sends a power control bit with a value of −1 to request a power step down. In response, the base station may increase or decrease the power of the forward traffic channel assigned to the particular mobile terminal by a value ΔP. The base station maintains the transmitted power at the new power value for a period T, equaling the duration of a power control group, until the base station receives a new PCB from the mobile terminal.

BRIEF SUMMARY OF THE INVENTION

In accordance with the purpose of the invention as embodied and broadly described herein, a method for controlling transmission power of signals transmitted between first and second radio communication devices includes estimating a quality of signals transmitted from the first radio communication device to the second radio communication device during a first power control group period ($T_1$); determining at least one power control bit based on the estimated signal quality; transmitting the at least one power control bit from the second radio communication device to the first radio communication device during the first power control group period; receiving the at least one power control bit at the first radio communication device; and modifying transmission power of signals transmitted from the first radio communication device to the second radio communication device based on the at least one power control bit at commencement of a second power control group period ($T_2$).

In another implementation consistent with the present invention, a method of facilitating forward link power control includes estimating a propagation channel Doppler frequency; selecting either a first process or a second process based on the estimated Doppler frequency; and determining a power control bit for controlling forward link power using the selected process.

In a further implementation consistent with the present invention, a method of facilitating forward link power control includes estimating signal quality of a forward link during a first power control group period ($T_1$); determining at least one power control bit based on the estimated signal quality; and transmitting the at least one power control bit on a reverse link during the first power control group period.

In an additional implementation consistent with the present invention, a method of controlling forward link power includes estimating signal quality of a forward link during a first power control group period ($T_1$); determining at least one power control bit based on the estimated signal quality; transmitting the at least one power control bit on a reverse link during the first power control group period ($T_1$); receiving the at least one power control bit on the reverse link; and modifying forward link power based on the at least one power control bit at commencement of a second power control group period ($T_2$).

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms that reduce forward link power control delay in radio-communications systems. The present invention reduces power control delay by estimating forward link traffic channel SIR over a period that is less than the period of the forward link power control groups. By estimating the forward link traffic channel SIR over this decreased period, the present invention may determine a power control bit, and transmit the power control bit to a base station during a current power control group, such that the base station can increment/decrement the power level of the forward traffic channel at the commencement of the next power control group. Decreasing the latency of the forward link power control, consistent with the present invention, may be particularly useful at high fading rates in the propagation channel that can be caused, for example, by fast mobile terminal mobility.

Figure 1:
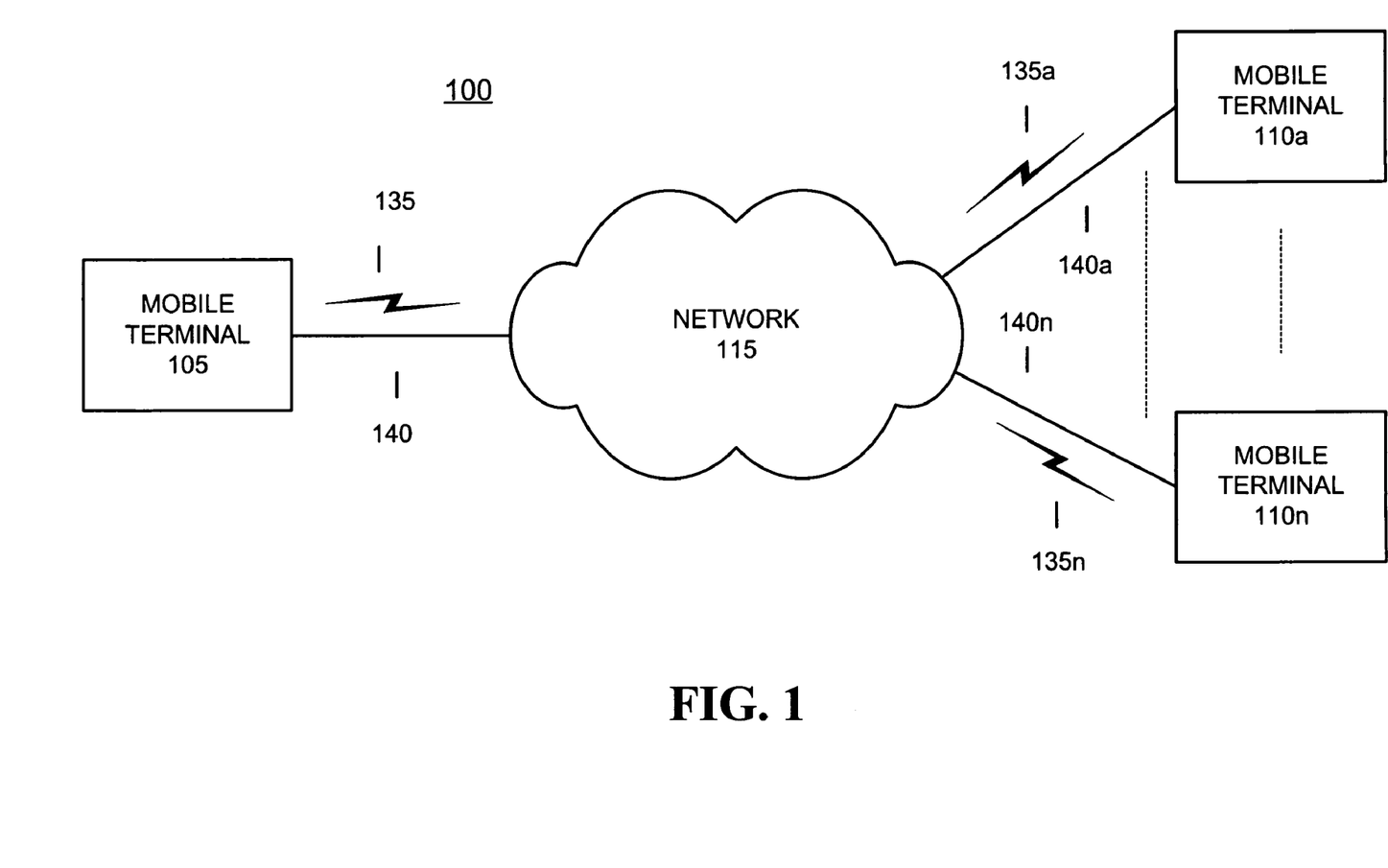
FIG. 1 illustrates an exemplary system in which a system and method, consistent with the present invention, may be implemented.

FIG. 1 illustrates an exemplary system 100 in which a system and method, consistent with the present invention, may implement forward link power control. System 100 may include mobile terminal 105 connected with mobile terminals 110a through 110n via network 115, using wired (140), wireless (135) or optical connection links (not shown). Network 115 may include one or more networks utilizing any type of multi-access media, including a local area network (LAN), metropolitan area network (MAN), satellite network, bi-directional cable television network, or cellular telephone network.

Mobile terminals 105 and 110a–110n may be similarly constructed and may include telephones, cellular radiotelephones, Personal Communications System (PCS) terminals or the like. PCS terminals may combine a cellular radiotelephone with data processing, facsimile and data communications capabilities. Mobile terminals 105 and 110a–110n may further include personal digital assistants (PDAs), conventional laptops and/or palmtop receivers, or other appliances that include radiotelephone transceivers, or the like. PDAs may include radiotelephones, pagers, Internet/intranet access, Web browsers, organizers, calendars and/or global positioning system (GPS) receivers. Mobile terminals 105 and 110a–110n may further be referred to as "pervasive computing" devices.

Figure 2:
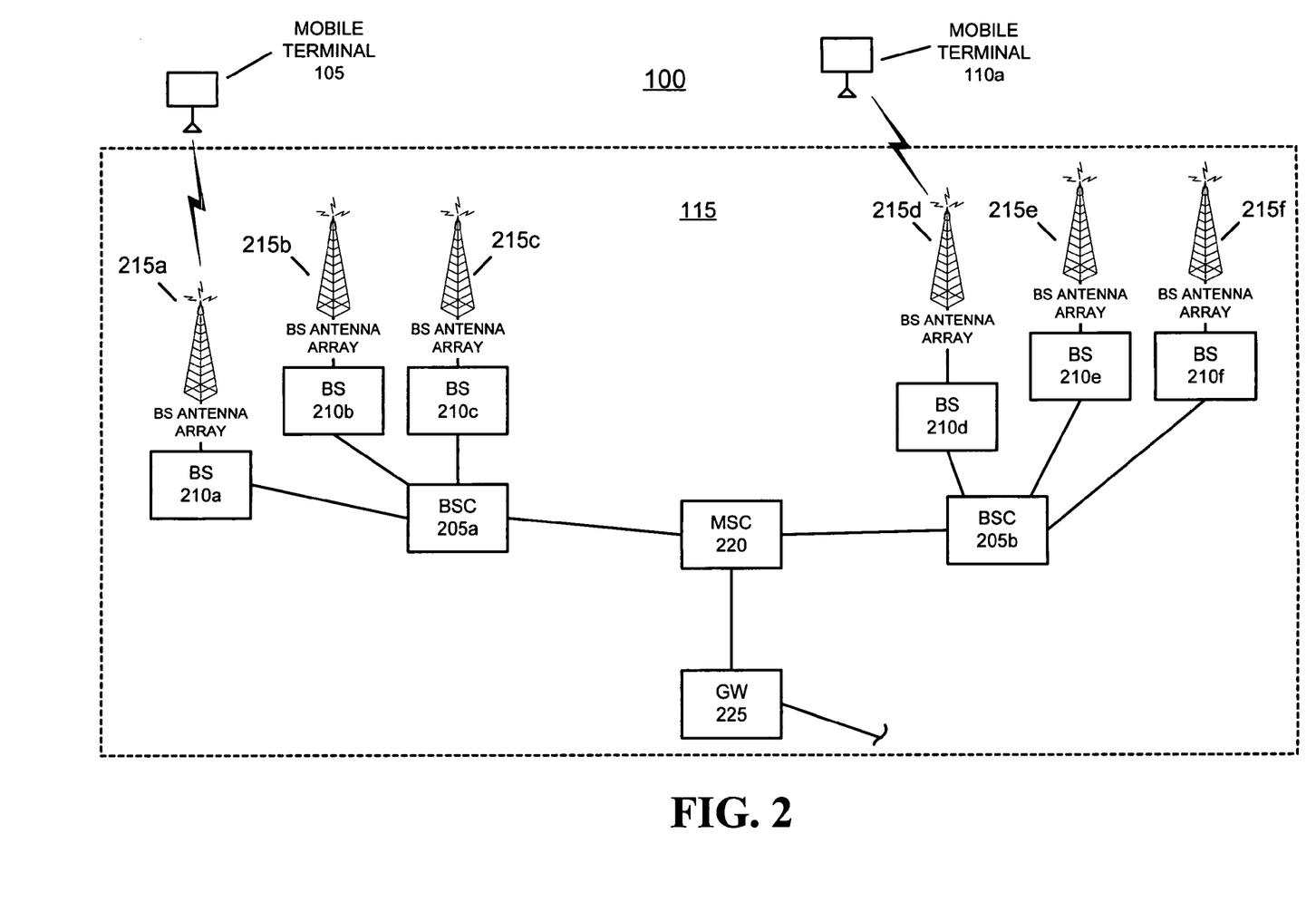
FIG. 2 illustrates an exemplary system including a cellular network consistent with the present invention.

FIG. 2 illustrates one example of system 100 in which a system and method, consistent with the present invention, may be implemented using a cellular network. System 100 may include mobile terminals 105 and 110a and a cellular network 115. Cellular network 115 may include one or more base station controllers (BSCs) 205a–205b, multiple base stations (BSs) 210a–210f, multiple base station antenna arrays 215a–215f, one or more mobile switching centers (MSCs), such as MSC 220, and one or more gateways (GWs), such as GW 225.

Cellular network 115 consists of components conventionally used for transmitting data to and from mobile terminals 105 and 110a–110n. Such components may include base station antenna arrays 215a–215f, which transmit and receive, via appropriate data channels, data from mobile terminals within their vicinity. Base stations 210a–210f connect to their respective antenna arrays 215a–215f, and format the data transmitted to, or received from the antenna arrays 215a–215f in accordance with conventional techniques, for communicating with BSCs 205a–205b or a mobile terminal, such as mobile terminal 105. Among other functions, BSCs 205a–205b may route received data to either MSC 220 or a base station (e.g., BS's 210a–210c or 210d–210f). MSC 220 routes received data to BSC 205a or 205b. GW 225 may route data received from an external domain (not shown) to an appropriate MSC (such as MSC 220), or from an MSC to an appropriate external domain.

Figure 3:
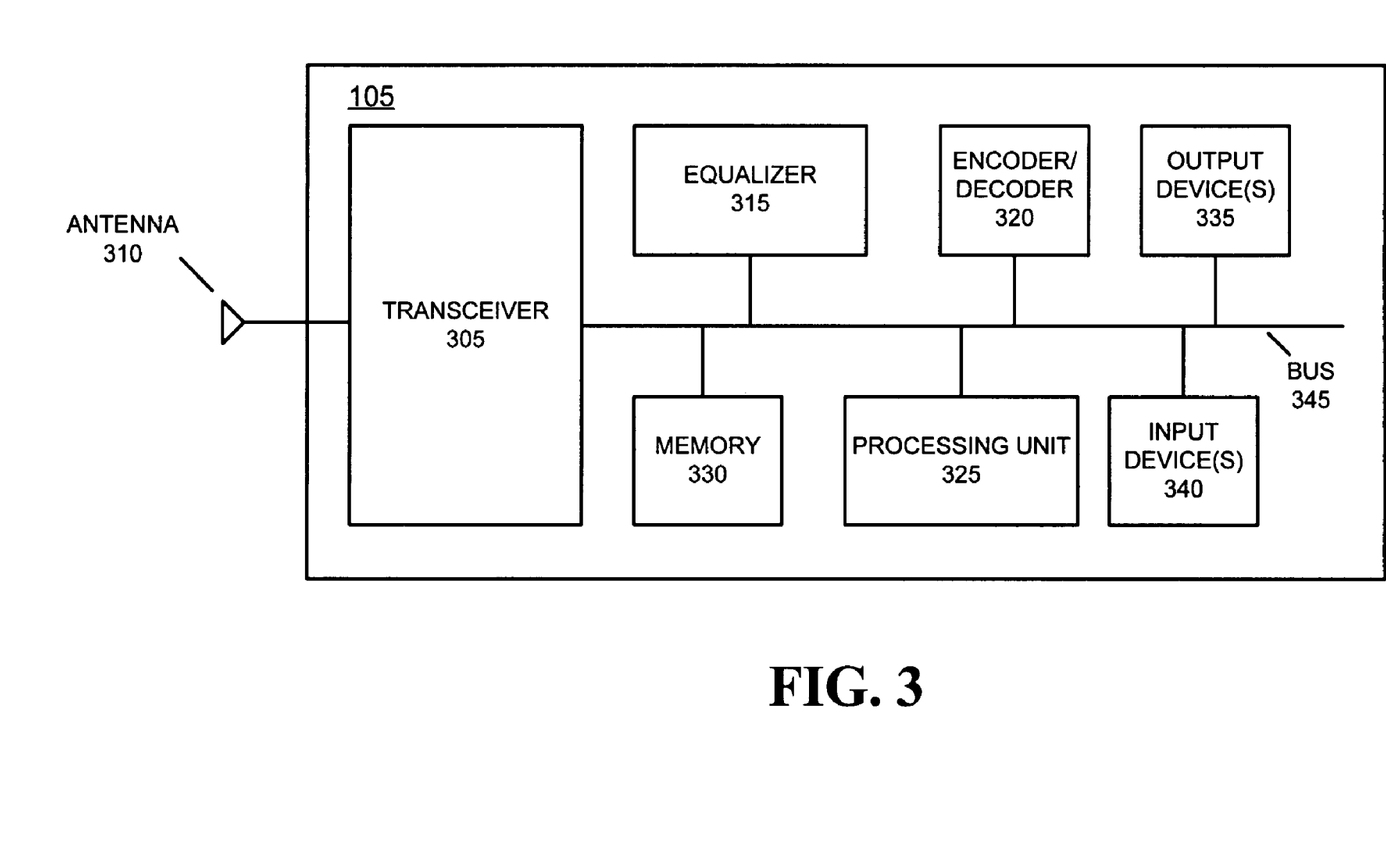
FIG. 3 illustrates an exemplary mobile terminal consistent with the present invention.

FIG. 3 illustrates an exemplary mobile terminal (MT) 105 consistent with the present invention. Mobile terminal 105 may include a transceiver 305, an antenna 310, an equalizer 315, an encoder/decoder 320, a processing unit 325, a memory 330, an output device(s) 335, an input device(s) 340, and a bus 345.

Transceiver 305 may include transceiver circuitry well known to one skilled in the art for transmitting and/or receiving symbol sequences in a network, such as network 115, via antenna 310. Transceiver 305 may include, for example, a conventional RAKE receiver. Transceiver 305 may further include conventional mechanisms for estimating the signal-to-interference ratio (SIR) of received symbol sequences. Transceiver 305 may additionally include conventional mechanisms for estimating the propagation channel Doppler frequency.

Equalizer 315 may store and implement conventional Viterbi trellises for estimating received symbol sequences using, for example, a conventional maximum likelihood sequence estimation technique. Equalizer 315 may additionally include conventional mechanisms for performing channel estimation.

Encoder/decoder 320 may include conventional circuitry for decoding and/or encoding received or transmitted symbol sequences.

Processing unit 325 may perform all data processing functions for inputting, outputting, and processing of data including data buffering and terminal control functions, such as call processing control, user interface control, or the like.

Memory 330 provides permanent, semi-permanent, or temporary working storage of data and instructions for use by processing unit 325 in performing processing functions. Memory 330 may include large-capacity storage devices, such as a magnetic and/or optical recording medium and its corresponding drive.

Output device(s) 335 may include conventional mechanisms for outputting data in video, audio, and/or hard copy format. Input device(s) 340 permit entry of data into mobile terminal 105 and may include a user interface and a microphone (not shown). The microphone can include conventional mechanisms for converting auditory input into electrical signals.

Bus 345 interconnects the various components of mobile terminal 105 to permit the components to communicate with one another.

The configuration of components of mobile terminal 105 illustrated in FIG. 3 is for illustrative purposes only. One skilled in the art will recognize that other configurations may be implemented.

Figure 4:
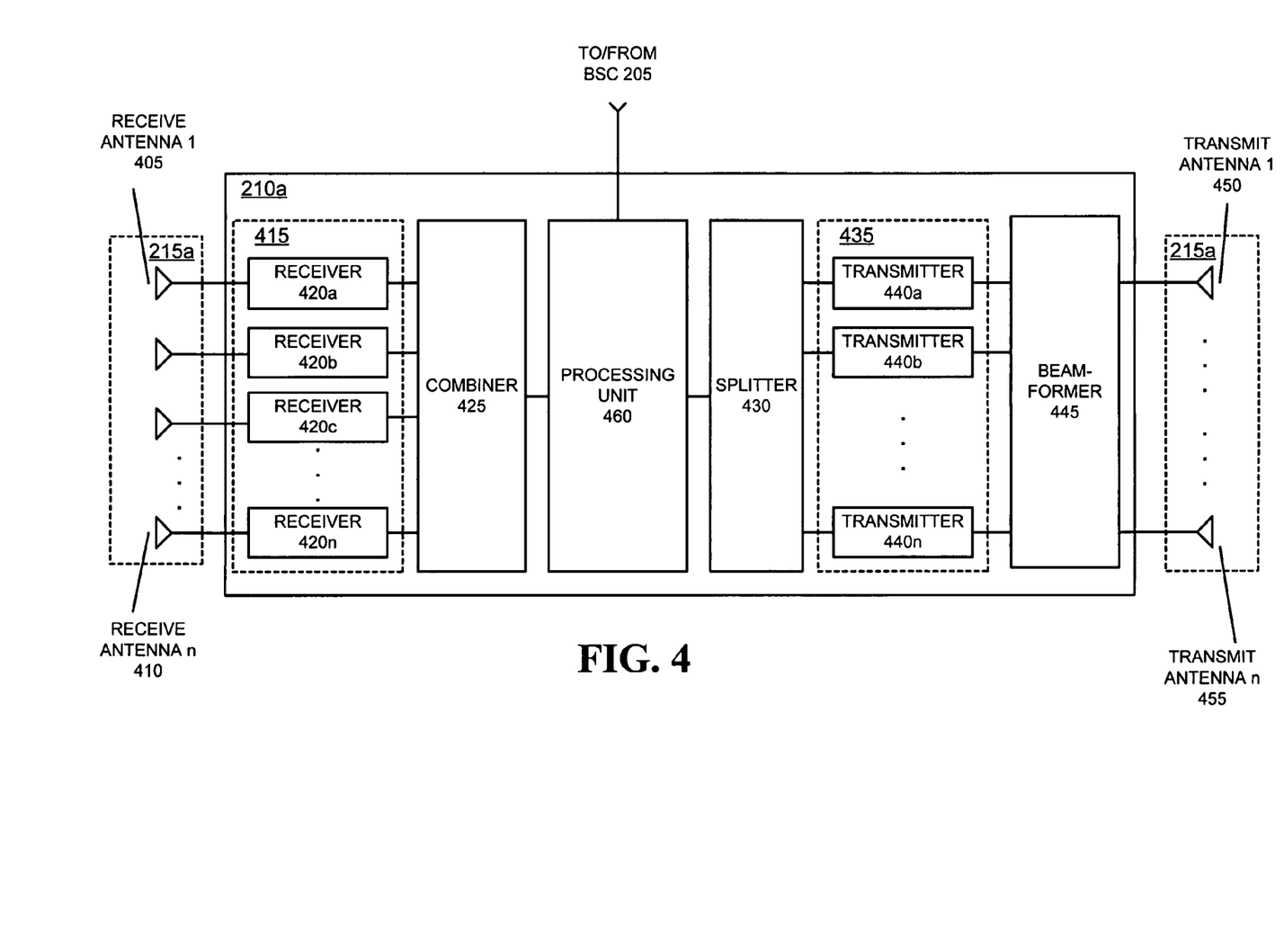
FIG. 4 illustrates an exemplary base station consistent with the present invention.

FIG. 4 illustrates an exemplary base station 210a and antenna array 215a consistent with the present invention. Base stations 210b–210f and antenna arrays 215b–215f may be similarly configured. Base station 210a may include a receiving unit 415, a combiner 425, a splitter 430, a transmitting unit 435, a beam former 445 and a processing unit 460. Antenna array 215a may include multiple receive antennas, including receive antenna 1 405 through receive antenna n 410. Antenna array 215a may further include multiple transmit antennas, including transmit antenna 1 450 through transmit antenna n 455.

Receiving unit 415 may include multiple receivers 420a–420n. Each of the multiple receivers 420a–420n may include receiver circuitry well known to one skilled in the art for receiving symbol sequences in a network, such as network 115, via a corresponding receive antenna 1 405 through receive antenna n 410. Such receiver circuitry may include radio frequency pre-amplifiers, filters and demodulators and other conventional devices used to convert the radio frequency received by the antenna to a stream of baseband equivalent complex symbols.

Combiner 425 receives the output symbol streams of receivers 420a–420n and selectively combines the symbol streams for transmission to BSC 205 in accordance with conventional techniques.

Splitter 430 receives data from BSC 205 and selectively supplies the data to a transmitter 440a–440n in transmitting unit 435 for subsequent transmission.

Transmitting unit 435 may include multiple transmitters 440a–440n. Each of the multiple transmitters 440a–440n may include transmitter circuitry well known to one skilled in the art for transmitting data symbols in a network, such as network 115, via transmit antenna 1 450 through transmit antenna n 455. Such transmitter circuitry may include amplifiers, filters, modulators and other conventional devices used to convert the received data into a radio frequency signal for transmission via transmit antenna 1 450 through transmit antenna 2 455.

Beamformer 445 may include conventional mechanisms for steering radio beams transmitted from antenna array 215a. Such conventional mechanisms may include, for example, a butler matrix.

Processing unit 460 may perform all data processing and control functions for receiving, processing, formatting and transmitting data. Processing unit 460 may connect to receiving unit 415, combiner 425, splitter 430, transmitting unit 435 and beamformer 445 via control lines (not shown).

The configuration of components of base station 210a and antenna array 215a illustrated in FIG. 4 is for illustrative purposes only. One skilled in the art will recognize that other configurations may be implemented.

Figure 5:
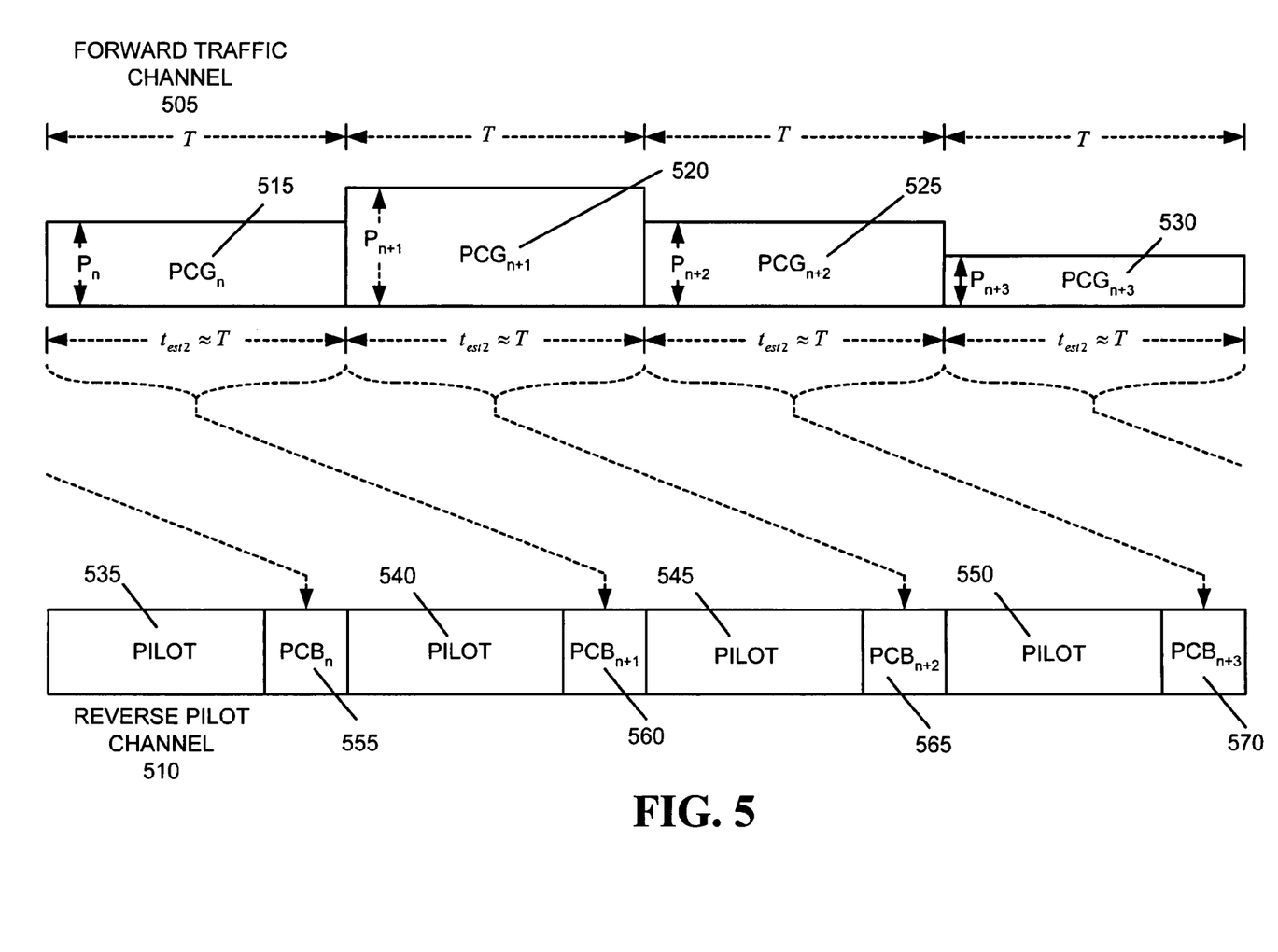
FIGS. 5–6 illustrate forward traffic channel and reverse pilot channel implementation of forward link power control consistent with the present invention.

FIG. 5 illustrates forward traffic channel 505 and reverse pilot channel 510 implementation of forward link power control in accordance with conventional techniques. Forward traffic channel 505 may include a frame of a specified duration and consisting of a specified number of power control groups (PCGs). Only four power control groups $PCG_n$ 515, $PCG_{n+1}$ 520, $PCG_{n+2}$ 525, and $PCG_{n+3}$ 530 are shown for simplicity. Each power control group includes a group of symbols transmitted from base station 210a at substantially the same power level (P) and over a power control group period (T). In an exemplary embodiment, forward traffic channel 505 may include a frame of 20 ms duration and consist of 16 power control groups of 1.25 ms duration each.

Reverse pilot channel 510 may include sequences of multiplexed pilot symbols (535, 540, 545 and 550) and power control bits PCBs (555, 560, 565 and 570) corresponding to each power control group of the forward traffic channel 505. To determine a power control bit (PCB), mobile terminal 105 estimates a signal-to-interference ratio (SIR) of forward traffic channel 505 over a SIR estimation time $t_{est2}$, where $t_{est2}$ is approximately equal to the power control group period T ($t_{est2} \approx T$). Based on the estimated SIR, mobile terminal 105 determines a PCB to transmit to base station 210a to control forward traffic channel 505 transmission power of a power control group. Since the SIR estimation time $t_{est2}$ is approximately equal to the power control group period T, mobile terminal 105 cannot transmit the PCB to base station 210a in sufficient time to modify the power level P of the forward traffic channel for the next power control group. Mobile terminal 105, therefore, multiplexes the PCB after the pilot symbol sequence during a subsequent power control group. Upon receipt of the PCB, base station 210a can adjust forward traffic channel to a new power level P.

For example, mobile terminal 105 can estimate the SIR during power control group $PCG_n$ 515, determine a power control bit $PCB_{n+1}$ 560 based on the estimated SIR, and multiplex $PCB_{n+1}$ 560 on reverse pilot channel 510 during the subsequent power control group $PCG_{n+1}$ 520. In response to receipt of $PCB_{n+1}$ 560 on reverse pilot channel 510, base station 210a can adjust the transmission power level for symbols transmitted over $PCG_{n+2}$ to the appropriate power level $P_{n+2}$. This process can similarly be repeated during power control groups $PCG_{n+2}$ and $PCG_{n+3}$, as illustrated in FIG. 5.

Figure 6:
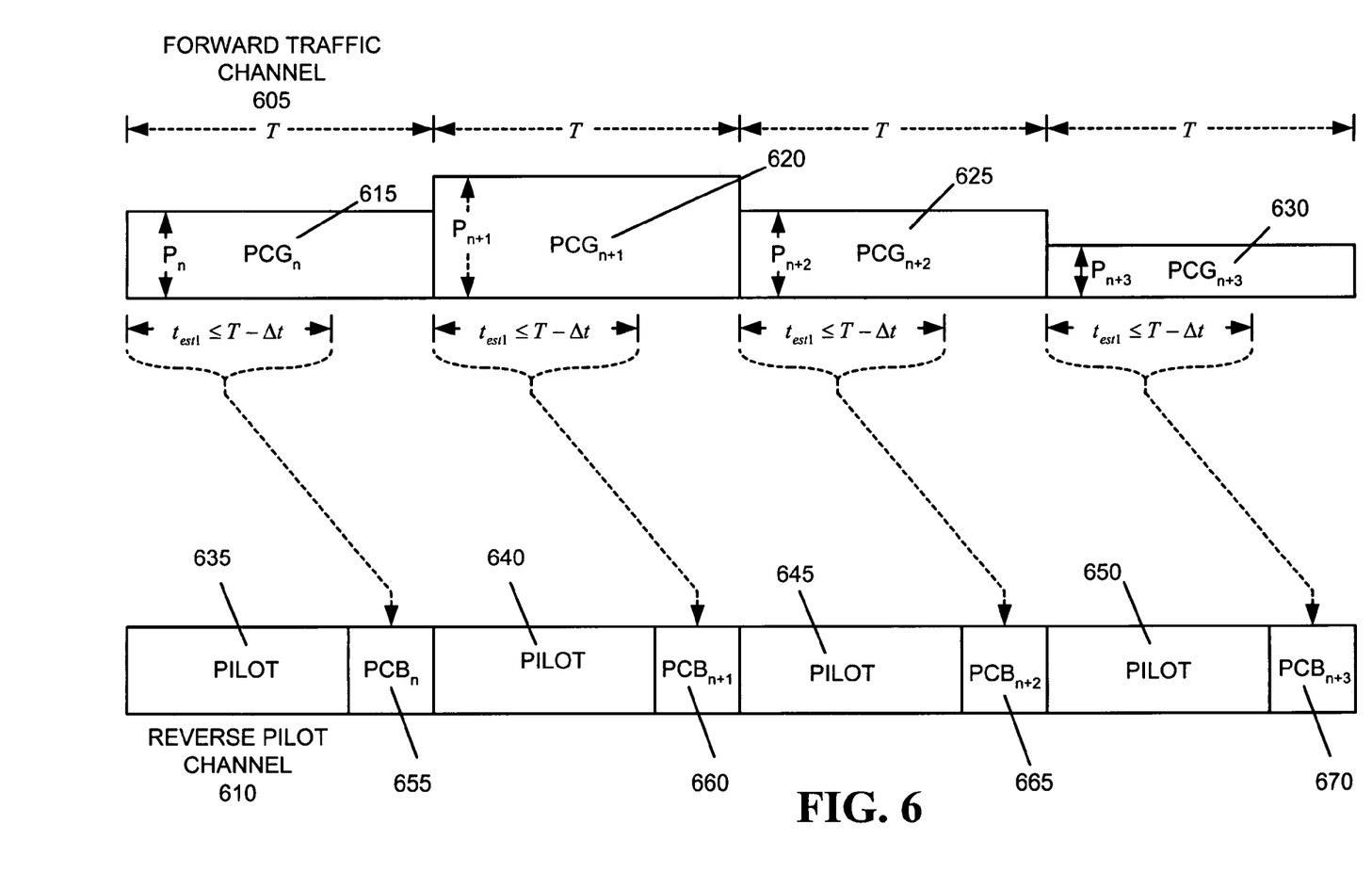

FIG. 6 illustrates forward traffic channel 605 and reverse pilot channel 610 implementation of forward link power control, consistent with the present invention. Similar to FIG. 5, forward traffic channel 605 may include a frame of a specified duration and consisting of a specified number of PCGs. Only four power control groups $PCG_n$ 615, $PCG_{n+1}$ 620, $PCG_{n+2}$ 625, and $PCG_{n+3}$ 630 are shown for simplicity. Each power control group includes a group of symbols transmitted from base station 210a at substantially the same power level (P) and over a power control group period (T). In an exemplary embodiment, forward traffic channel 605 may include a frame of 20 ms duration and consist of 16 power control groups of 1.25 ms duration each.

Reverse pilot channel 610 may include sequences of multiplexed pilot symbols (635, 640, 645 and 650) and PCBs (655, 660, 665 and 670) corresponding to each power control group of the forward traffic channel 605. To determine a PCB, mobile terminal 105 estimates a SIR of forward traffic channel 605 over a SIR estimation time $t_{est1}$, where $t_{est1} \leq T - \Delta t$ and where $\Delta t$ may include the total delay to transmit a power control bit from mobile terminal 105 to base station 210a and the duration of the power control bit. In one exemplary embodiment, $t_{est1}$ can be set at approximately ¾ of the PCG period T, thus, leaving ¼ of the PCG period T to transmit a power control bit to base station 210a.

Based on the estimated SIR, mobile terminal 105 determines a PCB to transmit to base station 210a to control the transmission power P of a power control group. Since the SIR estimation time $t_{est1}$ is less than the PCG period T by more than the PCB duration, mobile terminal 105 may transmit the PCB to base station 210a before the end of the current PCG period T, so as to modify the forward traffic channel 605 power for the next PCG. Mobile terminal 105, therefore, may multiplex the PCB after the pilot symbol sequence during the current power control group PCG.

For example, mobile terminal 105 may estimate the SIR during power control group $PCG_n$ 615, determine a power control bit $PCB_n$ 655, and multiplex $PCB_n$ 655 on reverse pilot channel 610 during the current power control group $PCG_n$ 615 period T. In response to receipt of $PCB_n$ 655 on reverse pilot channel 610, base station 210a may adjust the transmission power level for symbols transmitted over $PCG_{n+1}$ to $P_{n+1}$. This process can similarly be repeated during power control groups $PCG_{n+1}$, $PCG_{n+2}$ and $PCG_{n+3}$ as illustrated in FIG. 6.

FIGS. 7–11 illustrate exemplary processing, consistent with the present invention, for implementing reduced forward link power control delay at mobile terminal 105. As one skilled in the art will appreciate, the method exemplified by FIGS. 7–11 may be implemented as a sequence of instructions and stored in a computer-readable medium, such as memory 330 of mobile terminal 105, for execution by processing unit 325. A computer-readable medium may include one or more memory devices and/or carrier waves. Alternatively, the process may be implemented in hardware or in any combination of hardware and software.

Figure 7:
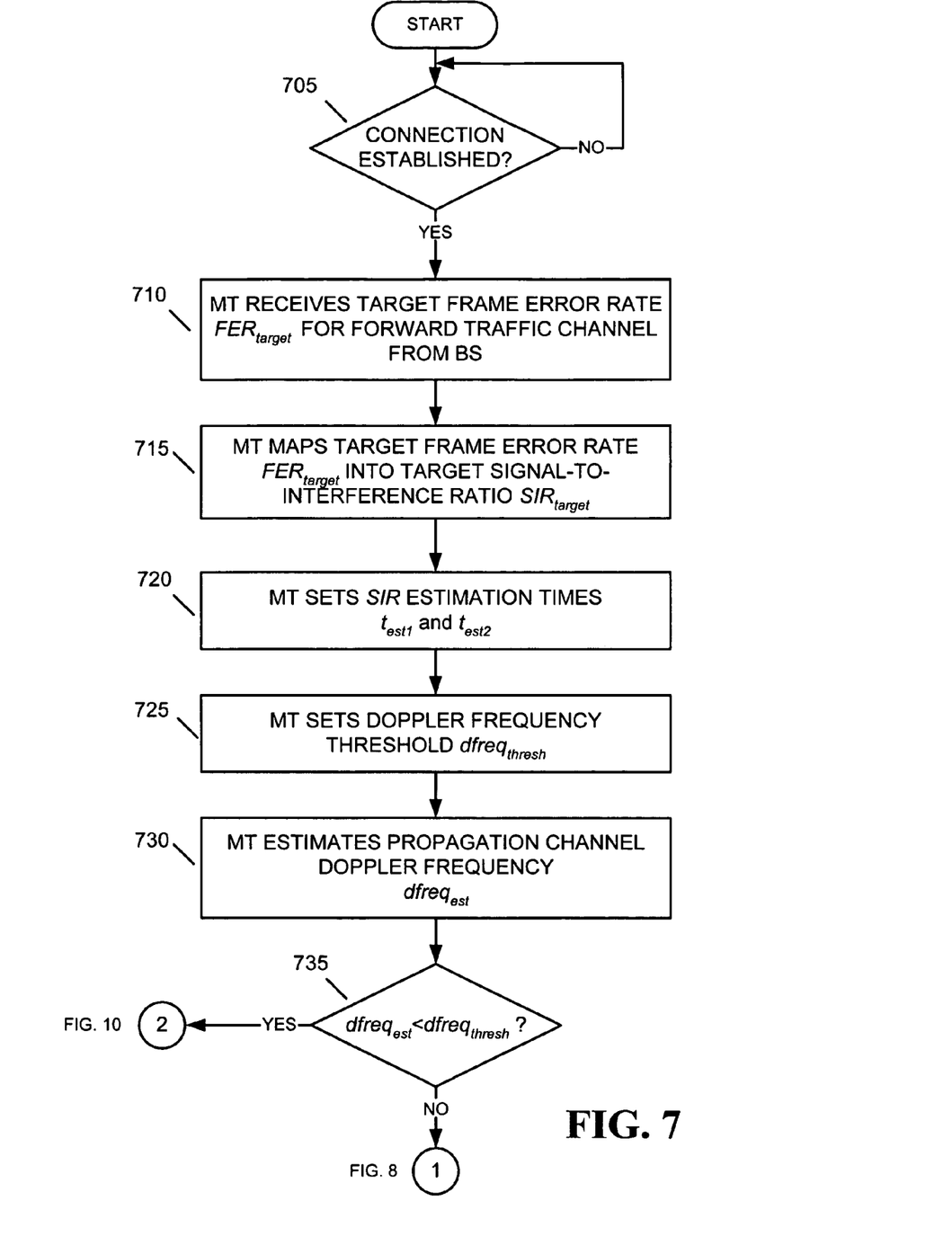
FIGS. 7–11 illustrate exemplary mobile terminal processing consistent with the present invention.

To begin processing, mobile terminal 105 determines if a connection has been established with a base station, such as base station 210a, in accordance with conventional techniques [step 705] (FIG. 7). Connection establishment may include, for example, initial call set-up between mobile terminal 105 and base station 210a or, for example, may include a handoff of mobile terminal 105 from another base station, such as base station 210b, to base station 210a. When a connection has been established, mobile terminal 105 may receive a target frame error rate ($FER_{target}$) for the forward traffic channel from base station 210a [step 710]. Using conventional techniques, mobile terminal 105 may map the received $FER_{target}$ into a target SIR ($SIR_{target}$) [step 715]. Mobile terminal 105 may then set signal-to-interference ratio estimation times $t_{est1}$ and $t_{est2}$ over which mobile terminal 105 may estimate the SIR in accordance with conventional techniques [step 720]. Mobile terminal 105 may further set a Doppler frequency threshold ($dfreq_{thresh}$) and store the threshold in memory 330 [step 725].

Figure 8:
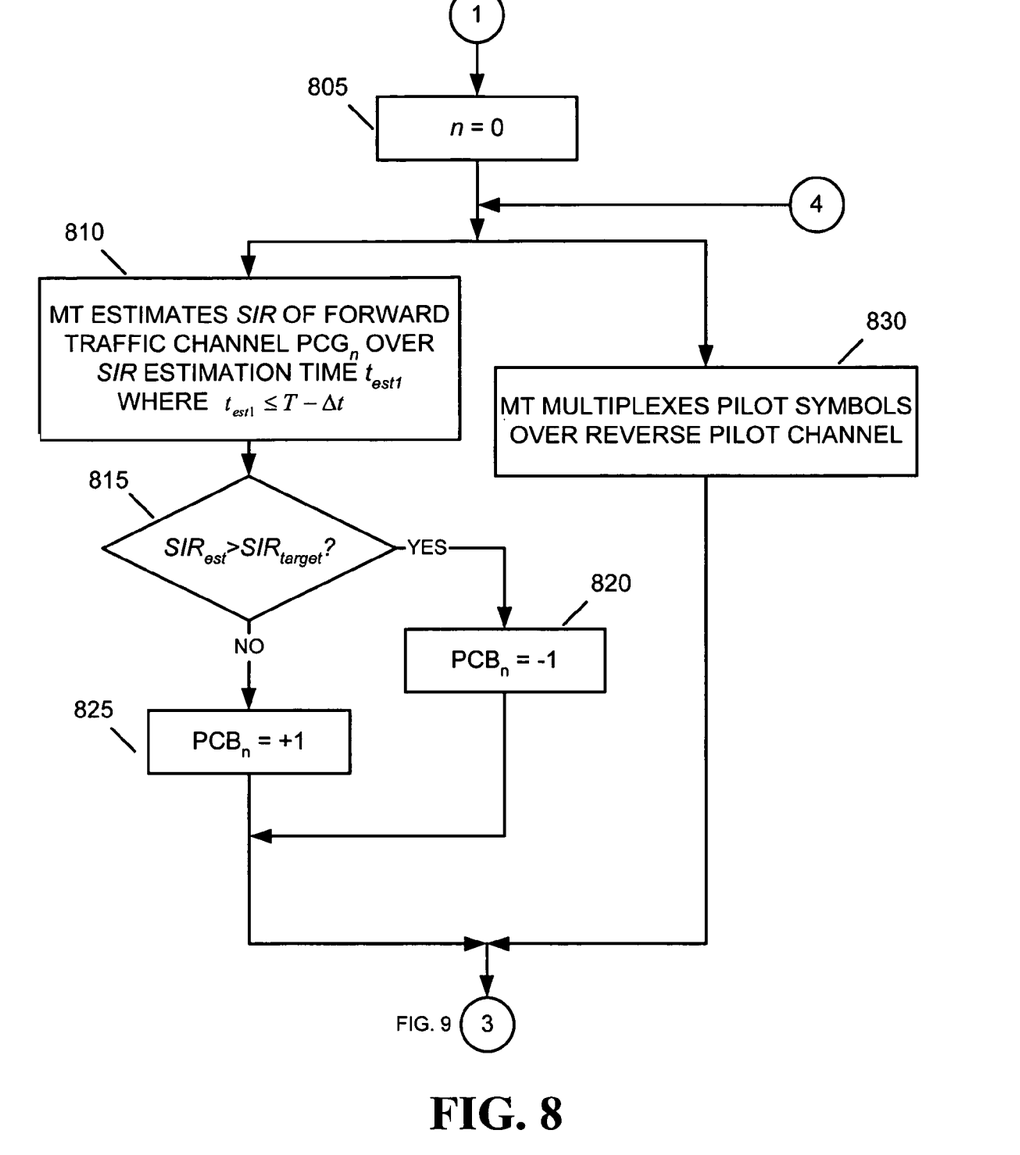

In accordance with conventional techniques, mobile terminal 105 may estimate a propagation channel Doppler frequency ($dfreq_{est}$) [step 730]. Mobile terminal 105 may then determine if the estimated Doppler frequency $dfreq_{est}$ is less than the stored Doppler frequency threshold $dfreq_{thresh}$ [step 735]. If so, processing proceeds to step 1005 of FIG. 10. If $dfreq_{est}$ is not less than $dfreq_{thresh}$, mobile terminal 105 sets a counter value n to zero [step 805] (FIG. 8). Mobile terminal 105 then may estimate the SIR ($SIR_{est}$), of the forward traffic channel power control group corresponding to the current value of n (PCGn), over the SIR estimation time $t_{est1}$, where $t_{est1}$ is less than, or equal to, the PCG duration T minus a time Δt [step 810]. Time Δt may include the total delay to transmit a power control bit from mobile terminal 105 to base station 210a and the PCB duration. Time Δt, thus, may include mobile terminal 105 processing time, mobile terminal 105 transmission time, PCB duration, propagation time, base station 210a processing time, and base station 210a power increment/decrement time.

Mobile terminal 105 may determine if $SIR_{est}$ is greater than $SIR_{target}$ [step 815]. If so, mobile terminal 105 may set a power control bit PCB corresponding to the current value of n to a negative 1 (−1) [step 820]. If $SIR_{est}$ is less than, or equal to, $SIR_{target}$, mobile terminal 105 may set the power control bit (PCBn) corresponding to the current value of n to a positive one (+1) [step 825]. Concurrently with steps 810 through 825 described above, mobile terminal 105 may multiplex conventional pilot symbols for transmission over the reverse pilot channel 610 [step 830].

Figure 9:
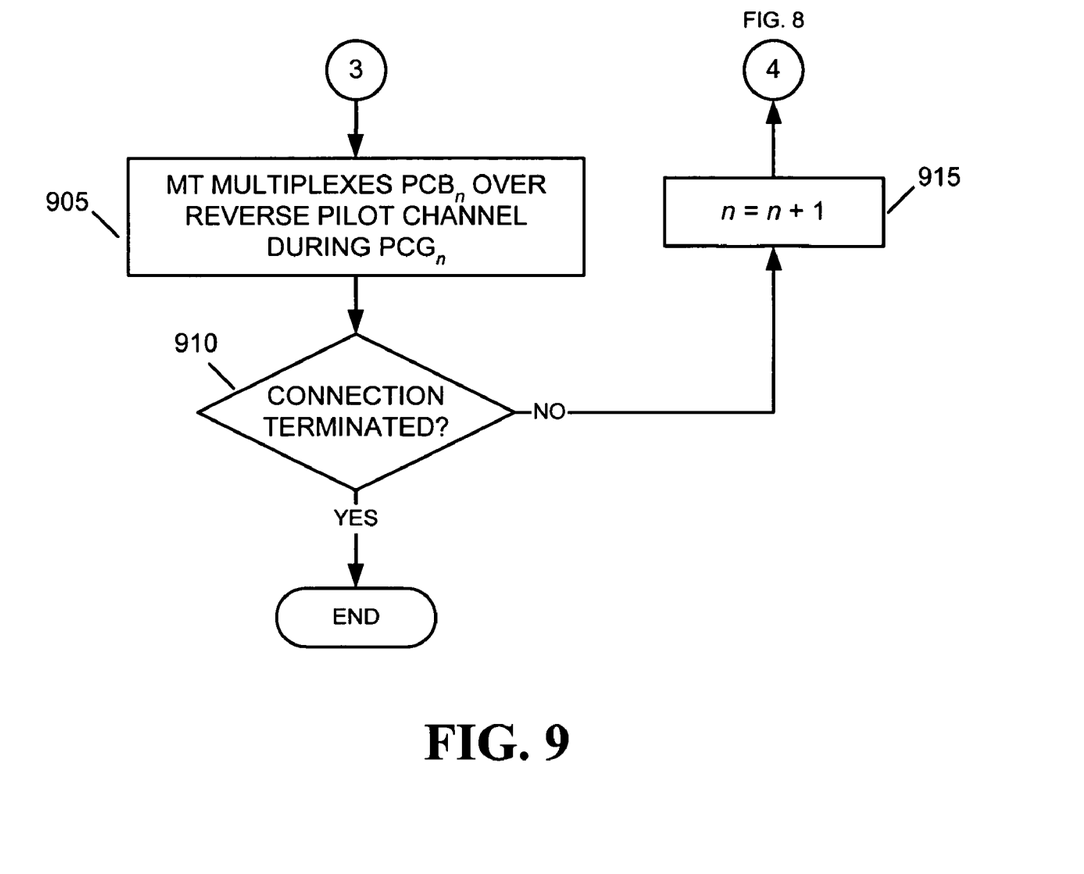

Subsequent to setting the value of the PCB and multiplexing the pilot symbols for the current PCG, mobile terminal 105 may multiplex the PCB over the reverse pilot channel 610 during the current power control group $PCG_n$ [step 905]. Mobile terminal 105 may then determine if the connection between it and base station 210a has been terminated [step 910]. If not, mobile terminal 105 increments the counter value n [step 915] and returns to steps 810 and 830. If the mobile terminal 105 determines that the connection has been terminated, then processing may end.

Figure 10:
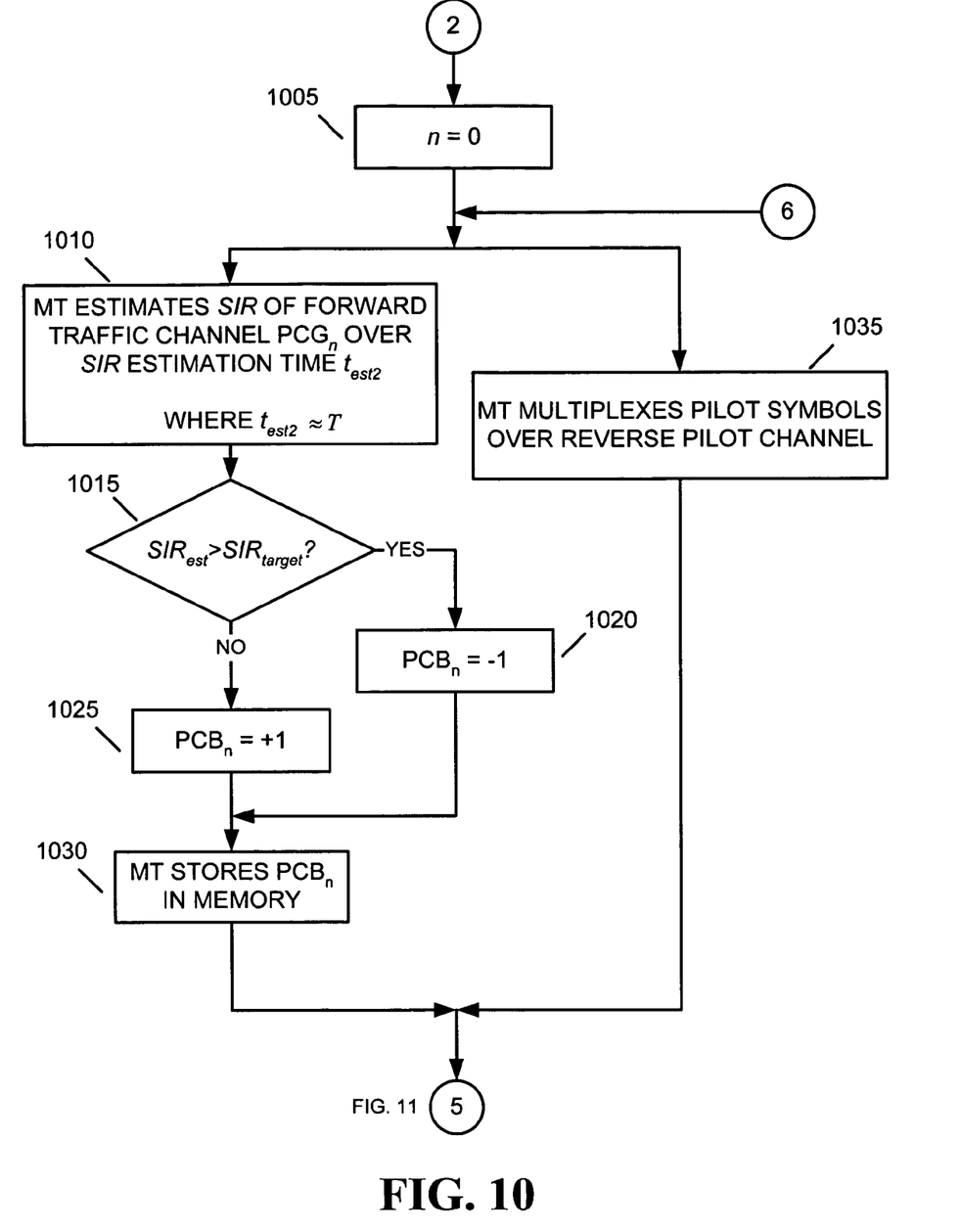

If mobile terminal 105 determines, at step 735, that $dfreq_{est} < dfreq_{thresh}$, than mobile terminal 105 may set the counter value n to zero [step 1005]. Mobile terminal 105 may then estimate the SIR, of the forward traffic channel 605 PCG corresponding to the current value of n, over SIR estimation time $t_{est2}$, where $t_{est2}$ is approximately equal to the PCG duration T ($t_{est2} \approx T$) [step 1010]. Mobile terminal 105 may determine if $SIR_{est}$ is greater than $SIR_{target}$ [step 1010]. If so, mobile terminal 105 may set a power control bit (PCBn) corresponding to the current value of n to a minus 1 (−1) [step 1020]. If $SIR_{est}$ is less than, or equal to, $SIR_{target}$, mobile terminal 105 may set PCBn to a positive one (+1) [step 1025]. Mobile terminal 105 may store the PCGn in a storage device, such as memory 330 [step 1030]. Concurrently with steps 1010 through 1030 described above, mobile terminal 105 may multiplex conventional pilot symbols for transmission over the reverse pilot channel 610 [step 1035].

Figure 11:
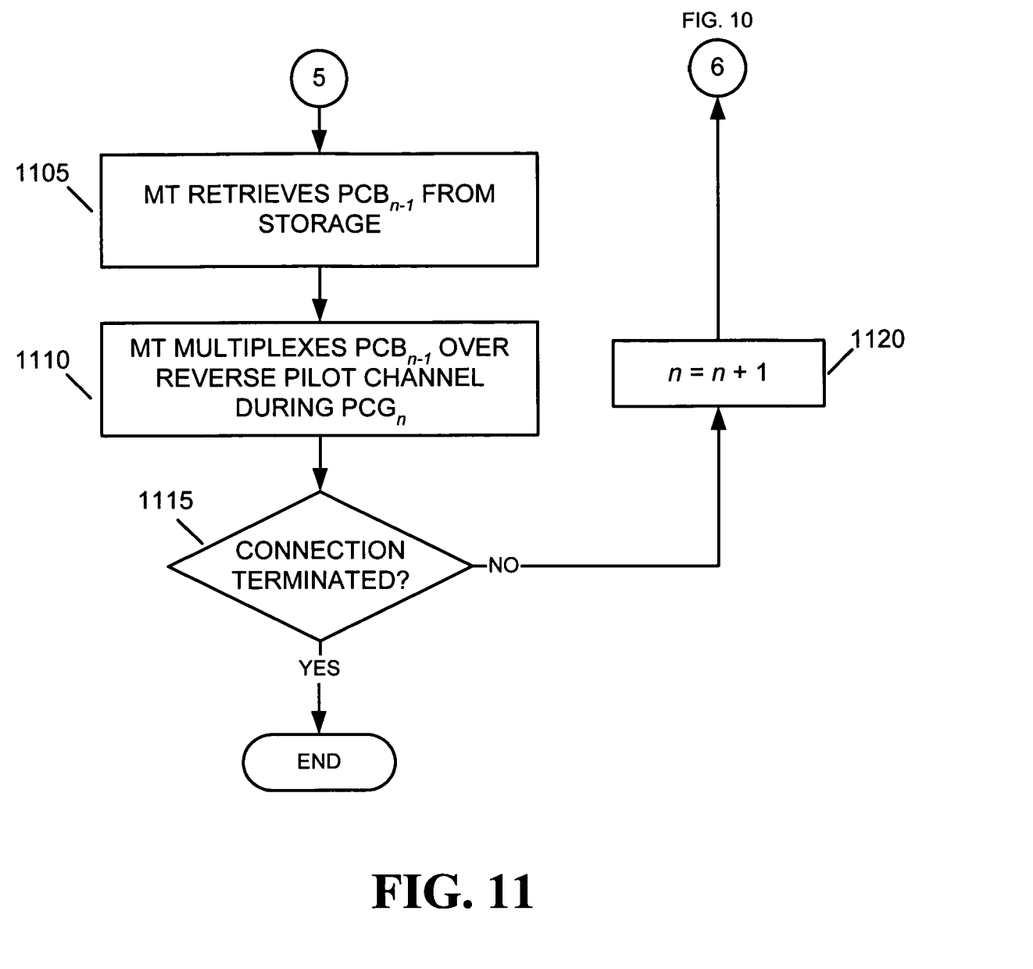

Subsequent to setting the value of the PCB and multiplexing the pilot symbols for the current PCG, mobile terminal 105 may retrieve a previously stored power control bit ($PCB_{n-1}$) corresponding to the current value of n minus 1 [step 1105]. Mobile terminal 105 may multiplex the $(n-1)^{th}$ PCB over the reverse pilot channel 610 during the current power control group PCGn [step 1110]. Mobile terminal 105 may then determine if the connection between it and base station 210a has been terminated [step 1115]. If not, mobile terminal 105 increments the counter value n [step 1120] and returns to steps 1010 and 1035. If mobile terminal 105 determines that the connection has been terminated, then processing may end.

Figure 12:
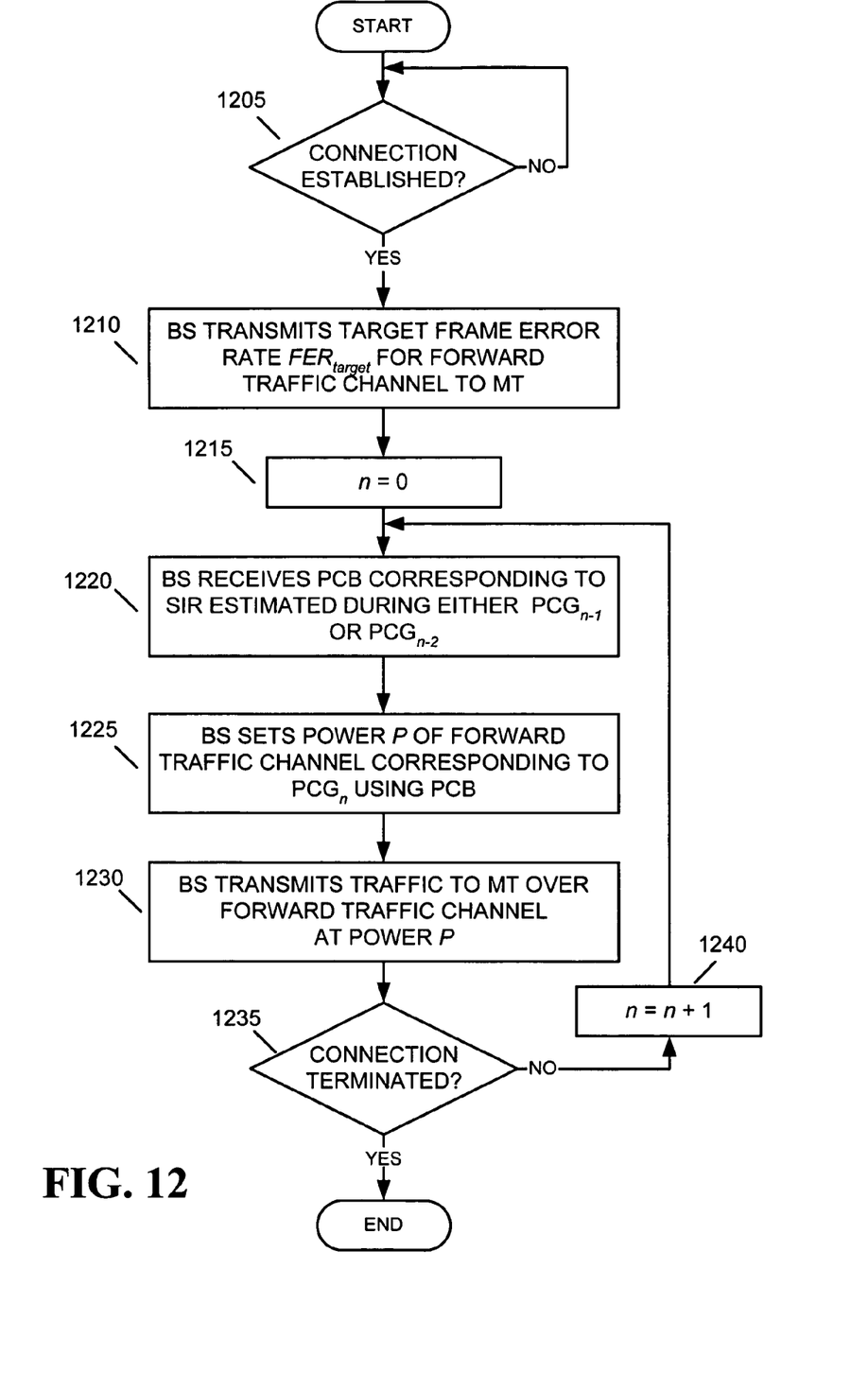
FIG. 12 illustrates exemplary base station processing consistent with the present invention.

FIG. 12 illustrates exemplary processing, consistent with the present invention, for implementing reduced forward link power control delay at a base station, such as base station 210a. As one skilled in the art will appreciate, the method exemplified by FIG. 12 may be implemented as a sequence of instructions and stored in a computer-readable medium, such as a memory (not shown) of base station 210a, for execution by processing unit 460. A computer-readable medium may include one or more memory devices and/or carrier waves. Alternatively, the process may be implemented in hardware or in any combination of hardware and software.

To begin processing, base station 210a determines if a connection has been established with mobile terminal 105 in accordance with conventional techniques [step 1205]. If a connection has been established, base station 210a may transmit a target frame error rate $FER_{target}$ for the forward traffic channel to mobile terminal 105 [step 1210]. Base station 210a may further set a counter value n to zero [step 1215]. Base station 210a may then receive a PCB over the reverse pilot channel corresponding to the SIR estimated by mobile terminal 105 during either of the previous two power control groups $PCG_{n-1}$ and $PCG_{n-2}$ [step 1220]. If mobile terminal 105 has determined the PCB in accordance with the processing of FIGS. 8–9, then base station 210a receives the PCB corresponding to the SIR estimated by mobile terminal 105 during $PCG_{n-1}$. If mobile terminal 105 has determined the PCB in accordance with the processing of FIGS. 10–11, then base station 210a receives the PCB corresponding to the SIR estimated by mobile terminal 105 during $PCG_{n-2}$.

Base station 210a may then set the power P of the forward traffic channel corresponding to the current power control group (PCGn) using the received PCB in accordance with conventional techniques [step 1225]. Base station 210a may then transmit data symbols to mobile terminal 105 over the forward traffic channel at power P [step 1230]. At step 1235, base station 210a may determine if the connection with mobile terminal 105 has been terminated. If not, base station 210a increments the counter value n [step 1240] and returns to step 1220. If base station 210a determines that the connection with mobile terminal 105 has terminated, then processing may end.

The foregoing description of embodiments of the present invention provides illustration and description, but it is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Also, while series of steps have been described with regard to FIGS. 7–12, the order of the steps may be varied in other implementations consistent with the present invention. No element, step, or instruction used in the description of the present application should be construed as critical or essential to the invention unless explicitly described as such.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may include any medium that can contain, store, communicate, propagate, or transport the program for use by, or in connection with, an instruction execution system, apparatus, or device. The computer-usable or computer-readable medium may include, for example but not limited to, an electronic, magnetic, optical, electromagnetic, infrared, or semiconductor system, apparatus, device, or propagation medium.

More specific examples (a non-exhaustive list) of a computer-readable medium would include the following: an electrical connection having one or more wires, a portable computer diskette, a random access memory (RAM), a read-only memory (ROM), a erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

One skilled in the art will recognize that the principles of the present invention may be applied to any wired or wireless system utilizing any type of multi-access scheme, such as TDMA, CDMA or FDMA. It should be further understood that the principles of the present invention may be utilized in hybrid systems that are combinations of two or more of the above multi-access schemes. In addition, a communication device, in accordance with the present invention, may be designed to communicate with, for example, a base station transceiver using any standard based on GSM, TDMA, CDMA, FDMA, a hybrid of such standards or any other standard.

The scope of the invention is defined by the claims and their equivalents.

What is claimed is:

1. A method for controlling transmission power of signals transmitted between first and second radio communication devices, comprising:

estimating a quality of signals transmitted from the first radio communication device to the second radio communication device during a first power control group period ($T_1$);

determining at least one power control bit based on the estimated signal quality;

transmitting the at least one power control bit from the second radio communication device to the first radio communication device during the first power control group period ($T_1$);

receiving the at least one power control bit at the first radio communication device; and modifying transmission power of signals transmitted from the first radio communication device to the second radio communication device based on the at least one power control bit at commencement of a second power control group period ($T_2$).

2. The method of claim 1, wherein the quality of the signals is estimated over a first time period ($t_{est1}$).

3. The method of claim 2, wherein the first time period ($t_{est}$) is less than the first power control group period ($T_1$).

4. The method of claim 3, wherein the first time period $t_{est} \leq T_1 - \Delta t$, where $\Delta t$ comprises at least a reverse link propagation delay.

5. The method of claim 1, wherein a first power control group associated with the first power control group period ($T_1$) comprises a number of symbols.

6. A method of facilitating forward link power control, comprising:

estimating a propagation channel Doppler frequency;

selecting either a first process or a second process based on the estimated Doppler frequency;

determining a power control bit for controlling forward link power using the selected process;

estimating signal quality of a forward link during a first power control group, the first power control group associated with a first power control group period ($T_1$), wherein the signal quality of the forward link is estimated over a first time period ($t_{est1}$) and wherein the first time period ($t_{est1}$) is less than ($T_1$);

determining the power control bit based on the estimated signal quality; and wherein the first time period $t_{est1} \leq T_1 - \Delta t$, where $\Delta t$ comprises at least a reverse link propagation delay.

7. The method of claim 6, wherein the second process comprises;

estimating signal quality of a forward link during a first power control group, the first power control group associated with a first power control group period ($T_1$), wherein the signal quality of the forward link is estimated over a first time period ($t_{est1}$) and wherein test is substantially equal to $T_1$; and determining the power control bit based on the estimated signal quality.

8. A method of controlling forward link power, comprising:

estimating signal quality of a forward link during a first power control group period ($T_1$);

determining at least one power control bit based on the estimated signal quality;

transmitting the at least one power control bit on a reverse link during the first power control group period ($T_1$);

receiving the at least one power control bit on the reverse link; and modifying forward link power based on the at least one power control bit at commencement of a second power control group period ($T_2$).

9. The method of claim 8, wherein the signal quality of the forward link is estimated over a first time period ($t_{est1}$).

10. The method of claim 9, wherein $t_{est1}$ is less than $T_1$.

11. The method of claim 9, wherein $t_{est1} \leq T_1 - \Delta t$, where $\Delta t$ comprises at least a reverse link propagation delay.

12. The method of claim 8, wherein a first power control group associated with the first power control group period comprises a number of symbols.

13. A communication system, comprising:
a mobile terminal that:
estimates signal quality of a forward link during a first power control group period ($T_1$),
determines at least one power control bit based on the estimated signal quality,
transmits the at least one power control bit on a reverse link during the first power control group period ($T_1$); and
a base station that:
receives the at least one power control bit on the reverse link, and
modifies forward link power based on the at least one power control bit at commencement of a second power control group period ($T_2$).

14. The communication system of claim 13, wherein the signal quality of the forward link is estimated over a first time period ($t_{est1}$).

15. The communication system of claim 14, wherein $t_{est1}$ is less than $T_1$.

16. The communication system of claim 15, wherein $t_{est1} \leq T_1 - \Delta t$, where $\Delta t$ comprises at least a reverse link propagation delay.

17. The communication system of claim 13, wherein a first power control group associated with the first power control group period comprises a number of symbols.

* * * * *

UNITED STATES PATENT AND TRADEMARK OFFICE
CERTIFICATE OF CORRECTION

| | | |
|---|---|---|
| PATENT NO. | : 7,069,034 B1 | Page 1 of 1 |
| APPLICATION NO. | : 09/717334 | |
| DATED | : June 27, 2006 | |
| INVENTOR(S) | : Sourour | |

It is certified that error appears in the above-identified patent and that said Letters Patent is hereby corrected as shown below:

Column 11, line 1, "The method of claim 9," should be changed to --The method of claim 10,--.

Signed and Sealed this

Twelfth Day of September, 2006

JON W. DUDAS
*Director of the United States Patent and Trademark Office*